United States Patent [19]

Blakely

[11] 4,045,055
[45] Aug. 30, 1977

[54] QUICK-CONNECT COUPLING

[75] Inventor: Stephen W. Blakely, Alton, Ill.

[73] Assignee: Olin Corporation, New Haven, Conn.

[21] Appl. No.: 597,242

[22] Filed: July 18, 1975

Related U.S. Application Data

[63] Continuation-in-part of Ser. No. 442,220, Feb. 13, 1974, Pat. No. 3,901,538.

[51] Int. Cl.² ............................................. F16L 35/00
[52] U.S. Cl. ..................................... 285/33; 285/110; 285/308; 285/322
[58] Field of Search .................... 285/33, 34, 319, 323, 285/322, 110, 308

[56] References Cited

U.S. PATENT DOCUMENTS

| | | | |
|---|---|---|---|
| 2,458,874 | 1/1949 | Parker | 285/34 |
| 3,390,898 | 7/1968 | Sumida | 285/34 |
| 3,635,501 | 1/1972 | Thomsen | 285/34 |
| 3,743,326 | 7/1973 | Courtot et al. | 285/323 |

FOREIGN PATENT DOCUMENTS 69,241  5/1958  France ................................. 285/110

*Primary Examiner*—Dave W. Arola
*Attorney, Agent, or Firm*—Robert H. Bachman

[57] ABSTRACT

The invention relates to a quick-connect coupling for use with a conventional threaded male coupling member in which a female coupling member is provided of such design that the male member may be inserted and locked without moving or rotating the female member. A resilient snap ring is situated at one end thereof within a tubular shell member and is provided at said end with internal threads for engaging and holding the male member in position. The snap ring possesses a peripheral bevel on the outer surface of said threaded end which seats within a correspondingly enlarged section of said shell to hold the snap ring in locking engagement with the male member. In the event that force is applied to the coupling to pull it apart, the bevel is forced against an interior wall of said enlarged section and the ring is forced to contract in diameter to effect said locking engagement.

4 Claims, 6 Drawing Figures

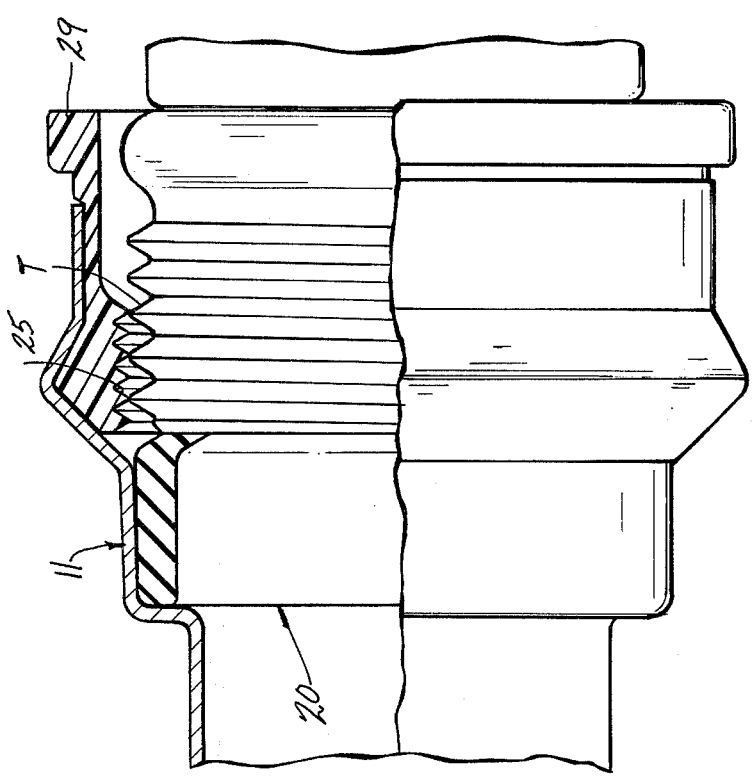
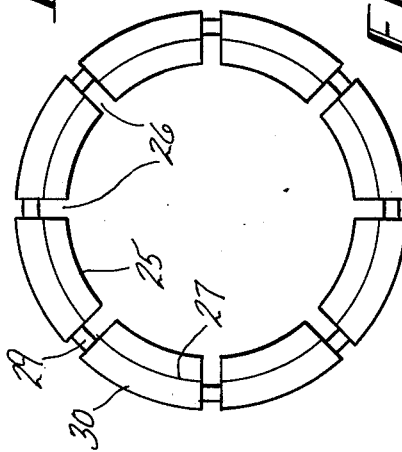
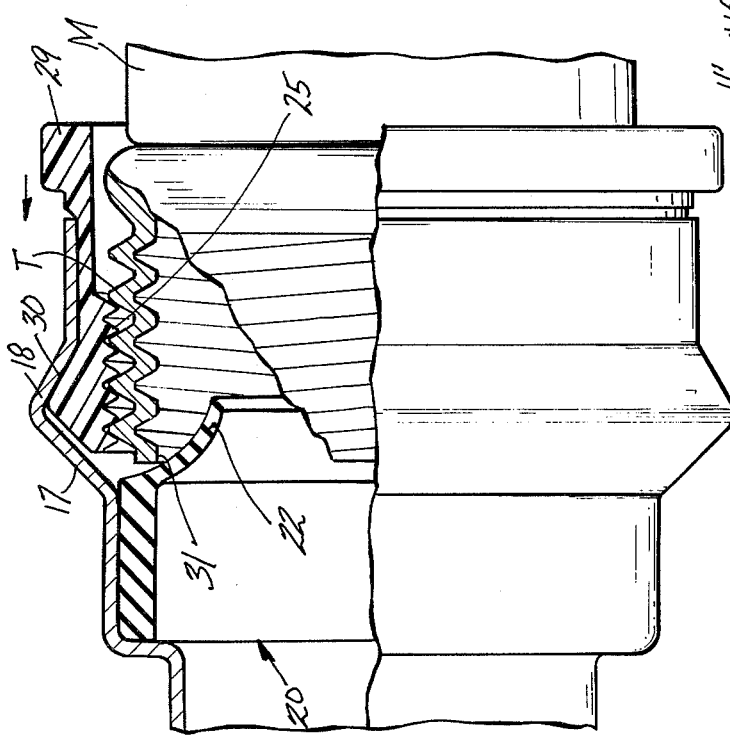
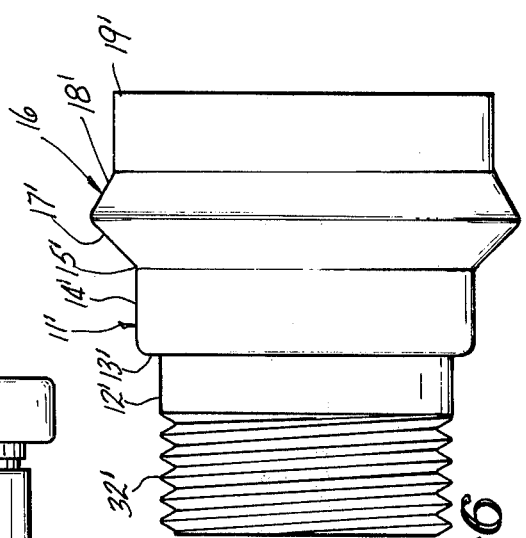

QUICK-CONNECT COUPLING

CROSS REFERENCE TO RELATED APPLICATION

This application is a Continuation-In-Part of copending U.S. patent application Ser. No. 442,220, filed on Feb. 13, 1974 U.S. Pat. No. 3901,538, Aug. 26, 1975, by the inventor herein.

BACKGROUND OF THE INVENTION

This invention relates in genreal to coupling devices, and more particularly to a quick-connect and disconnect coupling for conduits and the like.

Detachable connections for conduits and the like have conventionally comprised a pair of complementary threaded male and female member which were permanently mounted on the respective conduit ends. When connection of such a coupling was desired, the members were brought into contact and one member was rotated while the other member was kept stationary until rotation was impossible, so as to provide the threaded connection. Disconnection of the coupling involved a reversal of the above rotation. This type of coupling provided a satisfactory, leak-proof connection between conduits but was time consuming and could, in some cases, prove to be inconvenient.

Several coupling designs have been proposed in the prior art to simplify the connection and disconnection of conduits. One such design is disclosed in U.S. Pat. No. 3,635,501, to Thorne-Thomsen. The disclosed device comprises a female coupling which houses a snap ring possessing internally directed threaded lobes which engage and hold an inserted threaded male member. The operation of the device requires, however, the movement of an outer sleeve or cam-ring into contact with the snap ring to lock the male member in place after its insertion. Likewise, then, the reverse motion of the cam-ring is required to release the male member and permit its removal.

Another quick-connect design has been generally employed which provides the one-step connection of male and female coupling members and relies on the achievement of a locking engagement by entry of the two members into a predetermined position. Thus, for example, U.S. Pat. No. 3,352,576, to Thorne-Thomsen, provides a coupling assembly employing unthreaded male and female members wherein a locking means movably mounted in the female member engages an annular groove located on the male member. Upon insertion of the male member, a spring loaded sleeve mounted on the female member permits the expansion of the locking means and enables the male member to be inserted. Upon reaching the position within the female member whereby the locking means and the annular groove are in alignment, the locking means contracts into the annular groove and permits the sleeve to return to a position which holds the locking means in fixed engagement. Removal of the male member is accomplished by pulling back on the sleeve so as to permit the expansion of the locking means and the disengagement of the male member.

A variation of the one-step coupling is disclosed in U.S. Pat. No. 1,509,651, to Iftiger. Patentee's coupling likewise relies on the locking engagement of two unthreaded surfaces in a particular position, as tapered jaws are provided on a female member to engage an annular indentation on a nipple-like male member upon its full insertion. Release is accomplished by pulling back on an outer sleeve mounted on the female member, causing an attached inner sleeve to communicate with the tapered surfaces of the jaws and force them radially outward and away from contact with the annular groove.

As noted above, all of the previously mentioned coupling designs possess certain structural disadvantages. In the instance where the female coupling is adapted for use with a conventional threaded male coupling, the insertion of the male member into locking engagement requires the movement of a portion of the female coupling member, while those designs which afford one-step locking engagement require a connection between specially prepared unthreaded male and female coupling members which can only achieve locking engagement when united in one position.

In my above referenced parent application, a quick-connect coupling is disclosed which obviates the aforenoted prior art difficulties. A female coupling is provided for use with conventional threaded male couplings which employs as a novel locking means an inwardly sprung resilient snap ring. The snap ring is provided with internal threads for engaging the inserted male member in position and longitudinally projecting extensions which communicate with the angled end portion of an outer sleeve member when said member is pulled back, to force the radial expansion of the snap ring and the release of the male member.

Though the above coupling constitutes a marked advance over the prior art, it would be desirable to develop a coupling possessing greater adjustability with fewer moving parts which could be manufactured at a reduced cost.

SUMMARY OF THE INVENTION

The coupling of this invention comprises a female coupling member which is adapted for use with a conventional male coupling member and which possesses a novel locking means, the means being such that the two members become automatically locked together by a simple snap action merely upon introduction of the male member into the female member. The locking means of this invention comprises a resilient snap ring which is situated at one end thereof within a tubular shell member and is provided at said end with internal threads for engaging and holding the inserted male member in position in the female member regardless of the extent of its insertion. The threads are provided in a double-threaded arrangement which may be placed side-by-side or in a staggered relationship. The snap ring possesses a peripheral bevel on the outer surface of said threaded end which seats within a correspondingly inclined, inwardly funneled section of said shell member to hold the snap ring in locking engagement in the event that force is applied to the connection to pull the members apart. A sealing means possessing an expandable lip member extends into the main portion of the shell member to communicate with the male coupling member regardless of its extent of insertion so as to provide a leakproof fluid seal. Disengagement of the male member from the female coupling member of this invention is achieved by pulling back on an outer sleeve-like projection located on the end of the snap ring which protrudes from the shell member, whereby said peripheral bevel moves out of contact with an interior surface of said annularly enlarged section and allows the threaded end of the snap ring to move radially away from the male member.

The coupling of this invention can be employed with conventional male couplings and is economical to manufacture. Connection of the male member is accomplished in one step and is not restricted to one position. Separation of the two members is equally expeditious by a simple operation performed on the female member while pulling the members apart.

Accordingly, it is a principal object of the present invention to provide a coupling device which may be quickly connected and disconnected.

It is a further object of the present invention to provide a coupling device of simple construction and low cost which may be utilized with conventional threaded coupling members.

It is a still further object of the present invention to provide a coupling device which achieves locking engagement in one step.

It is a still further object of the present invention to provide a coupling device wherein locking engagement may be achieved in more than one position.

Further objects and advantages of the present invention will appear from the discussion which proceeds with reference to the following drawings.

BRIEF DESCRIPTION OF THE DRAWINGS

FIG. 3 is a sectional view of the female coupling member of FIG. 1, showing the male member in locking enegagement therewith.

FIG. 4 is a sectional view of the female coupling member of FIG. 1, showing the disengagement of the male member.

FIG. 5 is a top view of the snap ring shown in FIG. 2.

FIG. 6 is a side elevation of the shell member shown in FIG. 2 modified by the projection of a threaded end portion.

DETAILED DESCRIPTION OF THE PREFERRED EMBODIMENTS

Figure 1:
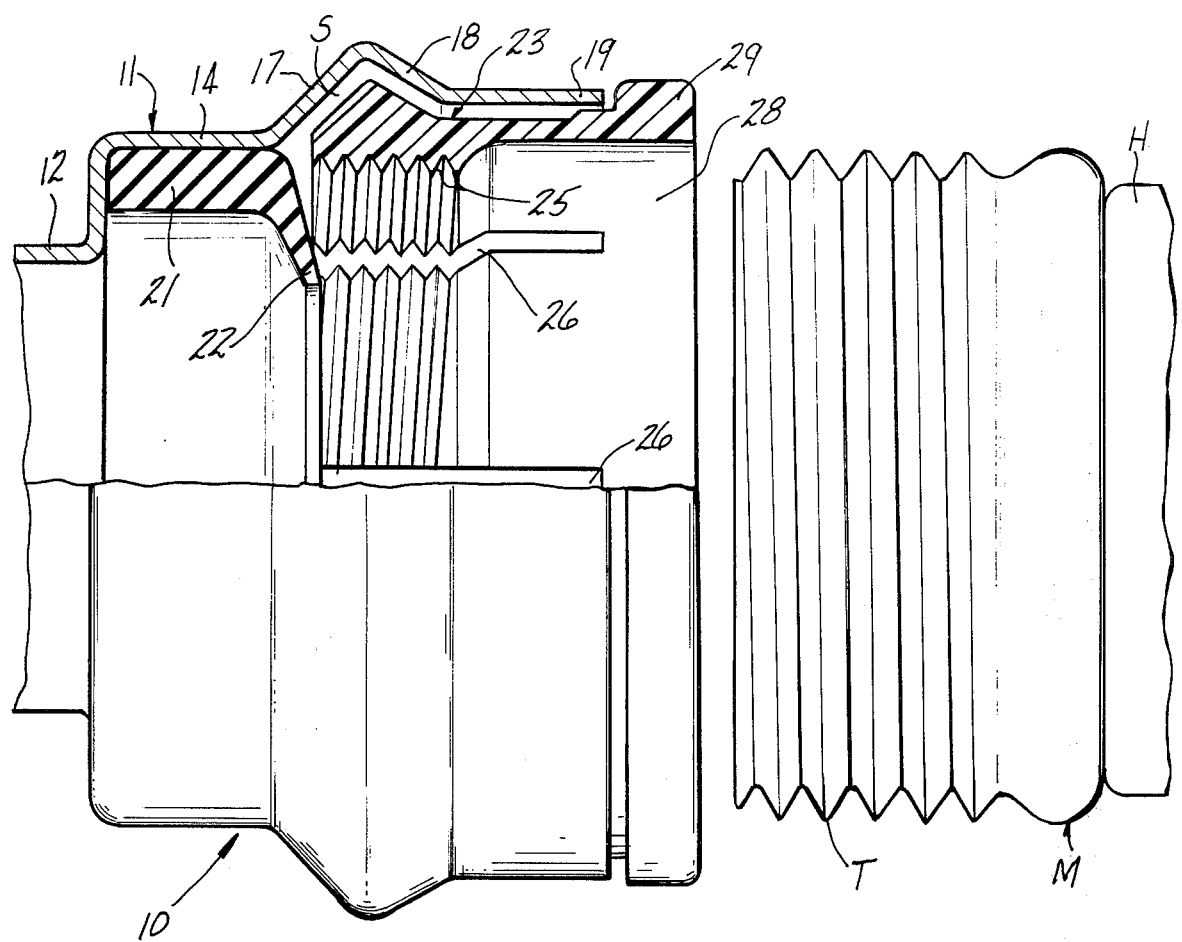
FIG. 1 is a side elevation partly in section of one embodiment of the present invention showing the female coupling member prior to introduction of the male member.
Figure 2:
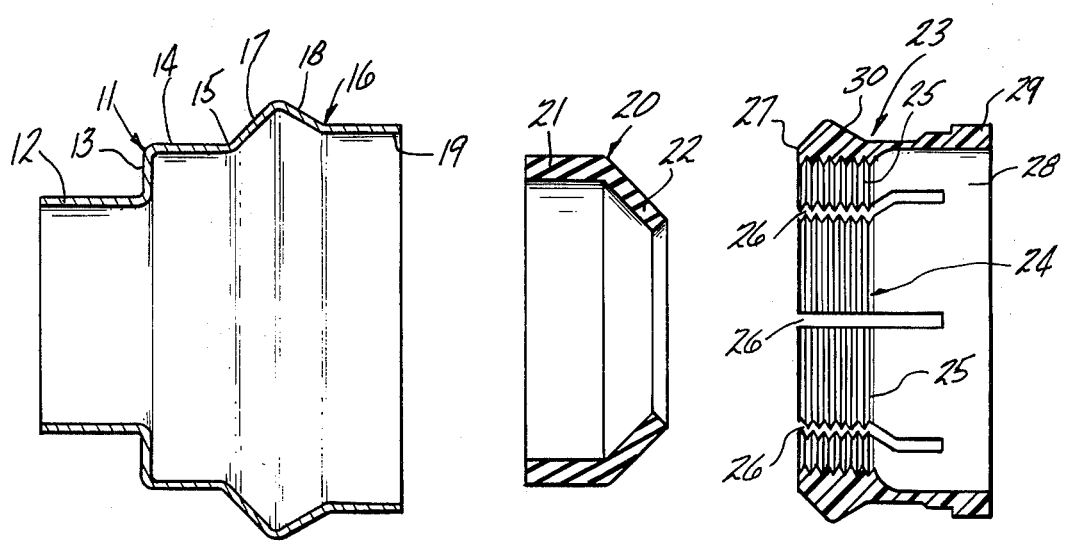
FIG. 2 is an exploded sectional view of the female coupling member of FIG. 1.

According to one embodiment of the present invention depicted in detail in FIGS. 1 and 2, there is shown a quick-connect coupling comprising a female coupling member designated generally as 10 comprising a shell member 11 which, as can be seen from FIG. 2, has a tubular elongated shank portion 12. The shell member diameter is increased at 13 to form a first enlarged portion 14, which houses the sealing means. The diameter of the shell member then increases once again at 15 to form the main portion thereo 16, which houses the resilient snap ring. Main portion 16 is radially outwardly extended at 17, and then radially inwardly funneled at 18 to accommodate the peripheral bevel of the snap ring in a manner hereinafter described. Main portion 16 terminates in a uniformly longitudinally extending mouth portion 19 of reduced diameter which cooperates with the sleeve-like projecting end of the snap ring in a manner likewise described hereinafter.

The first enlarged portion 14 of shell member 11 houses the sealing means of this invention. The sealing means 20 comprises a hollow gasket portion 21 which is axailly and radially inwardly extended at one end thereof to define a lip member 22. Lip member 22 can be visualized as frustoconical in shape, and, when sealing means 20 is positioned within first enlarged portion 14, will extend into the area defined by the main portion 16 to communicate with the male member M to be inserted, in a manner to be described hereinafter.

The sealing means of this invention must be sufficiently flexible to permit the expansion of lip member 22 during operation, while at the same time possessing sufficient resilience to retain its basic shape throughout long periods of intensive use. Several materials have been found to be suitable in this regard, among them natural and synthetic rubbers and substances such as polyvinyl chloride. Materials such as those aforenoted, which possess Durometer readings of about 50 possess suitable elasticity and resilience for the purpose of this invention. The invention is not limited thereby, however, as other uses of the coupling are possible which might require a sealing means prepared from a material possessing Durometer readings either higher or lower than that set forth above.

The main portion 16 of shell member 11 houses the resilient snap ring 23 which is shown in greater detail in FIGS. 2 and 5. Snap ring 23 possesses at one end thereof a threaded inner surface 24 which generally conforms in diameter to a standard female hose coupling for engagement with the threads of an inserted male member. The threads 25 defined by inner surface 24 may vary in depth, and may, for example, range from the standard 60° threaded angle to a shallower 100° angle without impairing the ability of the snap ring to successfully engage a wide variety of threaded male members. In accordance with the present invention, the threads 25 are provided in a double-threaded arrangement. That is, the depth of threads 25 is so reduced that two threads may be provided within the same pitch, pitch being defined as the axial distance traveled by a thread in one revolution. As can be seen in FIGS. 3 and 4 discussed in detail further on, the additional set of threads 25 facilitates a finer adjustment of the coupling position of the male member M to an optimum sealing position within coupling 10.

In addition to the provision of the feature of double-threads, the snap ring of the present invention possesses two other features which distinguish it from the snap ring of the above noted earlier invention. Firstly, snap ring 23 possesses a plurality of longitudinally extended slits 26 which commence at the threaded end 27 of snap ring 23 and continue until they reach the expanded thickness of sleeve-like projection 29, situated at the unthreaded end 28. Slits 26 serve a dual function, as they divide the threaded end 27 into discrete segments which are then capable of independent radially outward movement. Likewise the spaces provided between the segments enable threaded end 27 to constrict its diameter in response to pressure radially applied by the shell member at funneled portion 18. The number and size of slits 26 are depicted herein for purposes of illustration only, as both parameters may vary widely within the scope of the invention, and, accordingly, the invention should not be limited thereto.

The second feature of snap ring 23 has to do with the locking and releasing function of the coupling of the present invention. Specifically, referring to FIGS. 1, 2 and 5, the snap ring 23 possesses a radial enlargement on the outer surface adjacent to threaded end 27 which comprises a peripheral bevel 30 which is adapted to seat within the enlargement of main portion 16 defined by 17 and 18. Bevel 30 is of such size that when snap ring 23 is not engaged, threaded end 27 is able to radially expand into the aforenoted enlarged space S provided in main portion 16. When snap ring 23 is engaged, however, as can be seen in FIG. 3, bevel 30 is retained by the interior surface of radially funneled wall 18 of main portion 16, and threaded end 27 is, in effect forced to radially constrict around male coupling M to hold it in fixed position. Though bevel 30 has been depicted as having two beveled surfaces, it is only necessary that the surface contacting wall 18 need be inclined, and that, accordingly, a variety of shapes of bevel 30 are possible within the scope of the invention.

In addition to the provision of bevel 30 as the locking means of the present invention, snap ring 23 is provided at unthreaded end 28 with the release means for male coupling M, comprising sleeve-like projection 29, which extends axially beyond the terminus of end 28. Referring to FIGS. 1-4, and particularly to FIG. 2, projection 29 possesses a stepped-up outer thickness from that of the rest of end 28. This thickness serves to define a line of demarkation between flexible threaded end 27 and relatively rigid unthreaded end 28. Also, in its capacity as release means, projection 29 requires the stepped-up thickness to serve as a stop upon communication with the mouth portion 19 of shell member 11, after being pulled back thereto, as illustrated below. Naturally, the stepped-up thickness facilitates the grasp of projection 29 to perform the release action.

In the operation of the quick-connect coupling of FIG. 1, when a standard male hose coupling M, for example, possessing threads T and attached to hose H, is introduced, it travels through and engages threads 25 of snap ring 23, which because of its resilience, permits the male member to move forward until it encounters the lip member 22 of the sealing means. Upon release of the forward pressure on coupling M, snap ring 23 which has engaged threads T with threads 25, holds coupling M in position.

As shown in FIG. 3, the male member M is coupled to the female member 10 by threaded engagement with the snap ring 23. Because the snap ring is resilient yet comparably dimensioned to a standard female coupling, no external force is needed to engage the male member, and the coupling operation thus, requires only the insertion of the male member. Once inserted, coupling M is held in position by the radial pressure exerted by wall 18 in contact with bevel 30, upon threads 25. Naturally, if after engagement is completed, force is applied to pull the couple apart, the snap ring 23 will ride slightly forward in engagement with the member until threads 25 are fully constricted around threads T by the aforenoted radial pressure, at which point the male member M will be held in motionless locking engagement.

Referring again to FIG. 3, when the male member is coupled with the femal member, lip member 22 of sealing means 20 is somewhat distended but extends into the male coupling member. In the event that the coupling device of this invention is employed in a fluid conduit, sealing means 20 will respond to the pressure differential created by the fluid, and lip member 22 will expand radially outward and against the inner surface 31 of the male member so as to form a leak-proof seal. The size of the lip member 22 is such that an effective seal can be established although the male member is only partially inserted. The use just described, however, is merely exemplary, and the instant coupling device may be employed wherever a quick-connect and disconnect assembly is desired between two parts. For example, by suitable modification the instant coupling may be employed for joining electrical transmission members, the male and female members of the electrical connector being securely mounted within a conventional male coupling member and the female coupling member of this invention, respectively.

When removal of the male member from engagement with the female coupling of this invention is desired, sleeve 29 is moved longitudinally in the opposite direction from the male member as indicated by the arrow in FIG. 3 and illustrated in FIG. 4. Snap ring 23 is thereby retracted from contact with wall 18, likewise releasing the inward pressure exerted upon bevel 30, and the threads 25 of snap ring 23 are thus free to expand and release their firm engagement of the threads T of the male member. When this is done, the male coupling can be removed by simply pulling it away from the female coupling 10.

The shell member 11 shown in FIGS. 1-4 is designed for the case where it may be shrink fitted, crimped or otherwise fastened onto various conduits and appliances, fluid carrying and otherwise. Those skilled in the art can readily determine proper fabrication methods for holding the shell member shank 12 in engagement with the various conduits and appliances as aforenoted.

In the embodiment shown in FIG. 6, the structure of the shell member 11', insofar as portions 13'-19' are concerned, is the same as that shown in FIG. 2, however, it is apparent that shank portion 12' differs from shank 12 in that threads 32' are provided. The threads 32' allow the coupling device to be secured into the standard threaded female coupling which is found on such conduits and appliances as, for example, garden hoses, sprinklers, carwash-brush assemblies, insecticide dispensers and related articles. Thus, after the coupling device of this invention is secured into these appliances they may then be connected to a male hose coupling without the need of extended turning of threaded members. Additionally, if the coupling device having the threaded shank of FIG. 6 is secured into the standard female hose coupling, the hose can very easily be connected to conventional outdoor water taps which are generally standard male hose couplings. It is readily apparent that many uses exist in conjunction with fluid-carrying conduits and appliances for the coupling device of this invention.

The coupling of this invention may be produced from any desired material, and any desired manner. However, it has been found that sheet brass is particularly advangtageous in the production of this device. Such material results in a durable coupling which is capable of being produced at a low cost. All parts of the instant coupling may be of sheet brass other than the sealing means as aforenoted, and the snap ring. The snap ring may be manufactured from synthetic resins which may be determined within the skill of the art to possess the requisite resiliency and hardness.

It is to be understood that the invention is not limited to the illustrations described and shown herein which are deemed to be merely illustrative of the best modes of carrying out the invention, and which are susceptible of modification of form, size, arrangement of parts and details of operation, but rather is intended to encompass all such modifications which are within the spirit and scope of the invention as set forth in the appended claims.

What is claimed is:

1. A quick-connect coupling device comprising a female coupling member adapted for use with a conventional threaded male coupling member, wherein said female member comprises:

A. a tubular shell member of monolithic construction for receiving said male member comprising a shank portion, a first enlarged portion, a larger main portion, and a mouth portion, said shell member possessing an outer contour identical to its inner contour as defined by said shank portion, said first enlarged portion, said main portion and said mouth portion;

B. a sealing means housed within said first enlarged portion, said sealing means comprising a formed hollow gasket portion and a formed frustoconical lip member extending therefrom, and situated within said first enlarged portion whereby said lip member extends within the inner surface of said male member and is attached to expand radially outward and against said inner surface in response to internal fluid pressure to provide a leak-proof seal;

C. a resilient snap ring possessing at one end thereof internal threads for engaging and holding said male member, and at the same end thereof an outer surface defining an outwardly extended peripheral bevel;

D. a locking means located in said main portion which contacts the peripheral bevel of said snap ring and thereby forces said snap ring radially inward into locking engagement with said male member when removal without release is attempted; and E. release means located on said snap ring for permitting the removal of said male member comprising a longitudinally extended sleeve-like projection which extends beyond said mouth portion, which, when pulled back toward said mouth, releases radially inwardly directed pressure maintained on said snap ring through said bevel, and a plurality of radially displaced, longitudinally extended slits extending through the threaded end of said snap ring defining distinct, finger-like segments at said threaded end, said segments thereby adapted for radially outward movement to facilitate the release of said male member.

2. The device of claim 1 wherein said locking means comprises an enlarged inwardly funneled portion of said main portion which contacts said peripheral bevel and generates said radially inwardly directed pressure thereagainst.

3. The device of claim 1 wherein said internal threads are reduced in width to accommodate a double-threaded arrangement.

4. The device of claim 1 wherein said shell member possesses a threaded shank portion.

* * * * *